US012576458B2

(12) United States Patent
Richerzhagen et al.

(10) Patent No.: US 12,576,458 B2
(45) Date of Patent: Mar. 17, 2026

(54) METHOD FOR DETERMINING A POSITION OF A LIQUID JET

(71) Applicant: SYNOVA SA, Duillier (CH)

(72) Inventors: Bernold Richerzhagen, Saint-Sulpice (CH); Adrian Gheorghe, Lausanne (CH); Maximilian Epple, Assens (CH); Annika Richmann, Lausanne (CH)

(73) Assignee: SYNOVA SA, Duillier (CH)

( * ) Notice: Subject to any disclaimer, the term of this patent is extended or adjusted under 35 U.S.C. 154(b) by 986 days.

(21) Appl. No.: 17/738,381

(22) Filed: May 6, 2022

(65) Prior Publication Data

US 2022/0258282 A1 Aug. 18, 2022

Related U.S. Application Data

(63) Continuation of application No. 15/321,630, filed as application No. PCT/CH2015/000089 on Jun. 12, 2015, now abandoned.

(30) Foreign Application Priority Data

Jun. 23, 2014 (EP) ..................................... 14405052

(51) Int. Cl.
| | |
|---|---|
| *B23K 26/146* | (2014.01) |
| *B05B 12/00* | (2018.01) |
| *B05B 12/08* | (2006.01) |
| *B23K 26/035* | (2014.01) |
| *B26F 3/00* | (2006.01) |

(52) U.S. Cl.
CPC .......... *B23K 26/146* (2015.10); *B05B 12/004* (2013.01); *B05B 12/082* (2013.01); *B23K 26/035* (2015.10); *B26F 3/004* (2013.01); *B26F 3/00* (2013.01)

(58) Field of Classification Search
None
See application file for complete search history.

(56) References Cited

U.S. PATENT DOCUMENTS

| | | | | |
|---|---|---|---|---|
| 5,902,499 | A * | 5/1999 | Richerzhagen | .... B23K 26/1423 |
| | | | | 219/121.72 |
| 6,559,934 | B1 | 5/2003 | Yee et al. | |
| 8,939,894 | B2 | 1/2015 | Morrissette et al. | |
| 2002/0166191 | A1 | 11/2002 | Josdal | |
| 2002/0198515 | A1* | 12/2002 | Somani | ............... A61F 9/00802 |
| | | | | 250/252.1 |

(Continued)

FOREIGN PATENT DOCUMENTS

| | | |
|---|---|---|
| DE | 10 2010 011 580 A1 | 9/2011 |
| DE | 10 2012 003 202 A1 | 8/2013 |

(Continued)

*Primary Examiner* — Elizabeth M Kerr

(74) *Attorney, Agent, or Firm* — Birch, Stewart, Kolasch & Birch, LLP

(57) ABSTRACT

A method for determining a spatial position of a liquid jet, in particular of a liquid jet for optically guiding a laser beam, comprises the steps: providing a collision object having a measuring point for interacting with the liquid jet, detecting a state of the liquid jet in a first configuration between collision object and liquid jet, changing the configuration so that the state of the liquid jet changes, detecting the configuration change between the first and second configuration.

16 Claims, 7 Drawing Sheets

(56) References Cited

U.S. PATENT DOCUMENTS

| | | | |
|---|---|---|---|
| 2004/0026382 | A1 | 2/2004 | Richerzhagen et al. |
| 2004/0234122 | A1 | 11/2004 | Kochi et al. |
| 2007/0278195 | A1 | 12/2007 | Richerzhagen et al. |
| 2014/0021178 | A1 | 1/2014 | Brockmann et al. |
| 2014/0107958 | A1 | 4/2014 | Kaisha |

FOREIGN PATENT DOCUMENTS

| | | | |
|---|---|---|---|
| EP | 0 762 947 | B1 | 3/2003 |
| EP | 1 833 636 | B1 | 7/2010 |
| JP | 63-245400 | A | 10/1988 |
| JP | 2005-523131 | A | 8/2005 |
| JP | 2009-262163 | A | 11/2009 |
| JP | 2011-212710 | A | 10/2011 |
| WO | WO 03/090867 | A1 | 11/2003 |

* cited by examiner

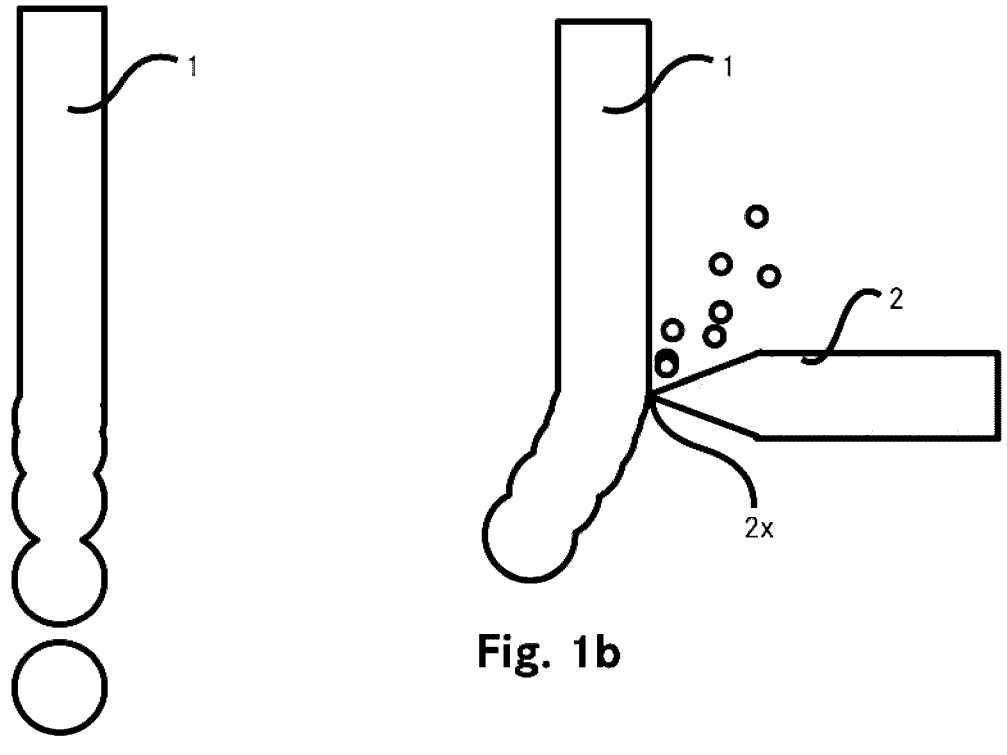
Fig. 1b
Fig. 1a
Fig. 1c
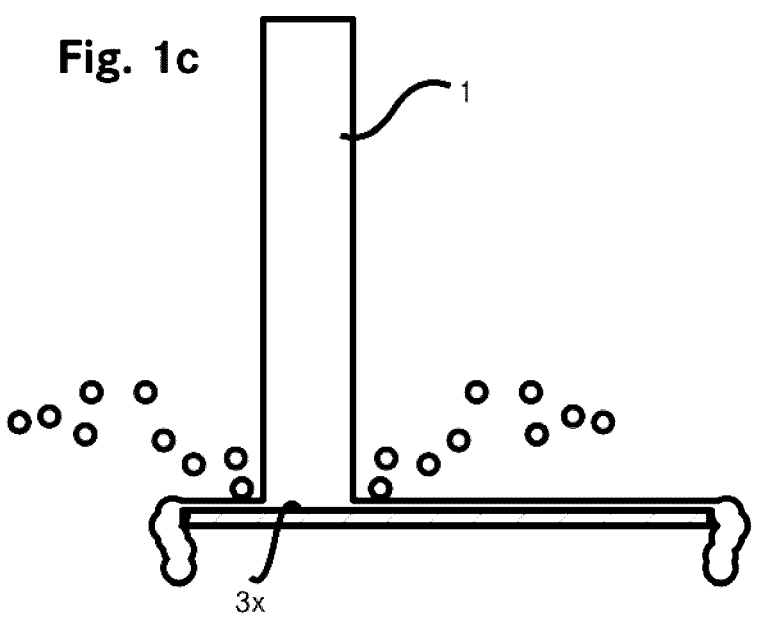

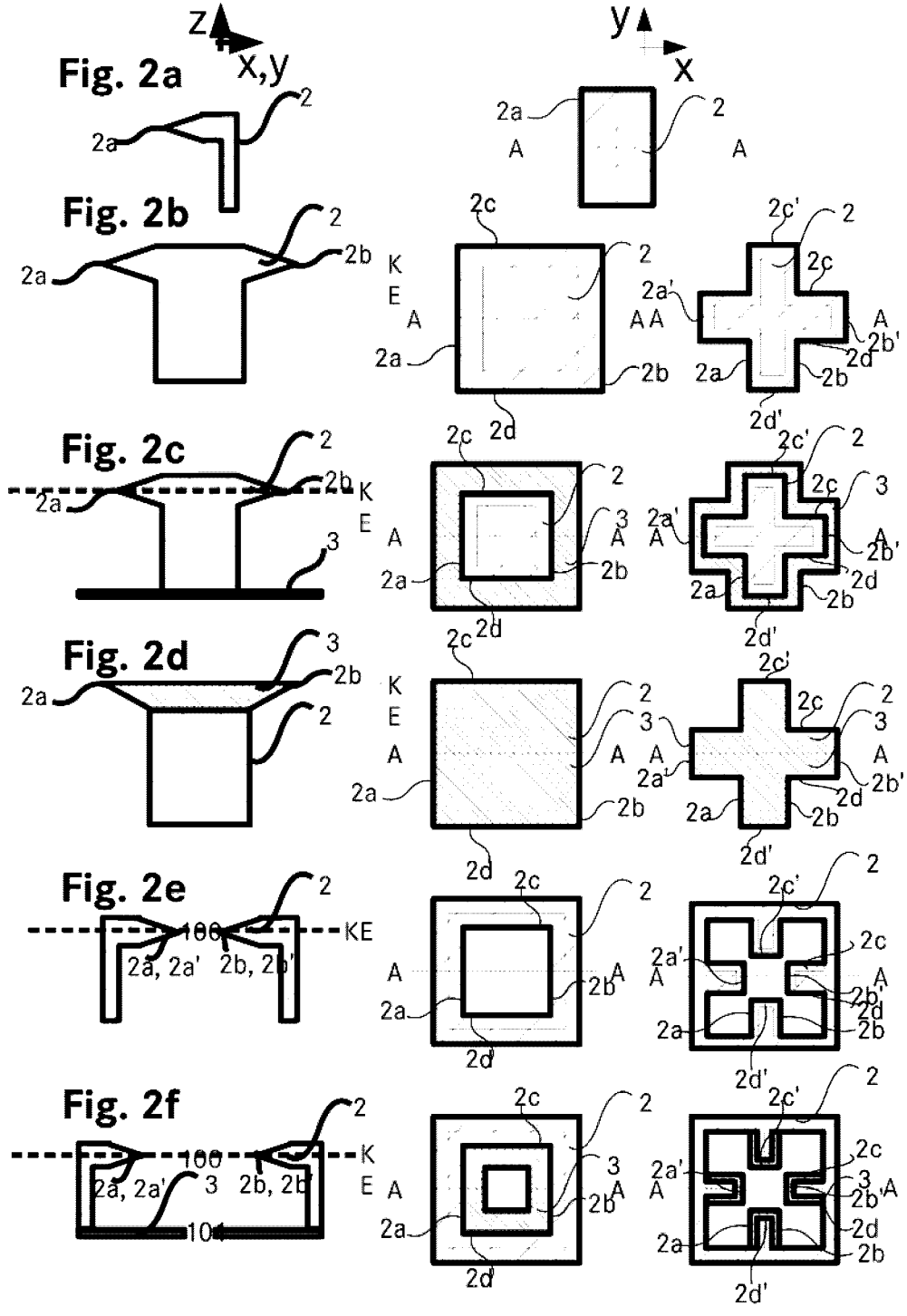

Fig. 4a
Fig. 4b
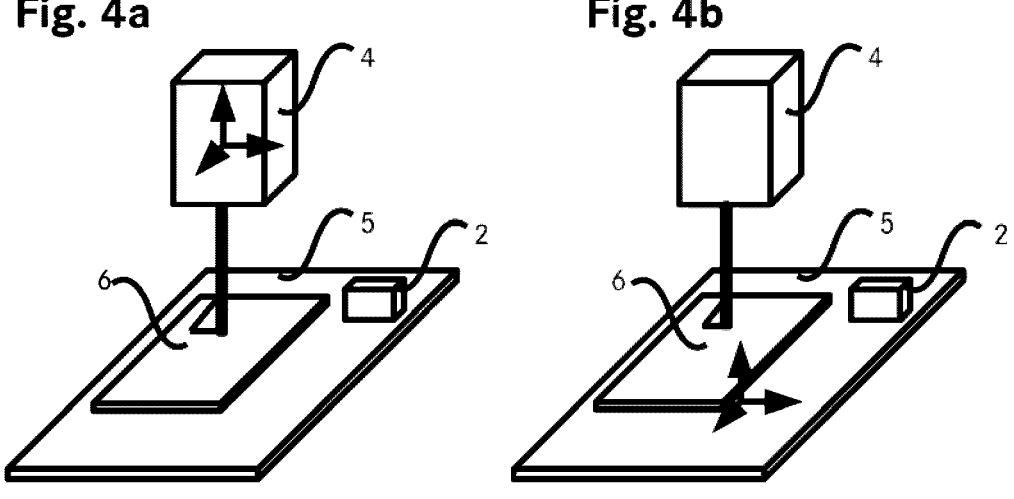
Fig. 5
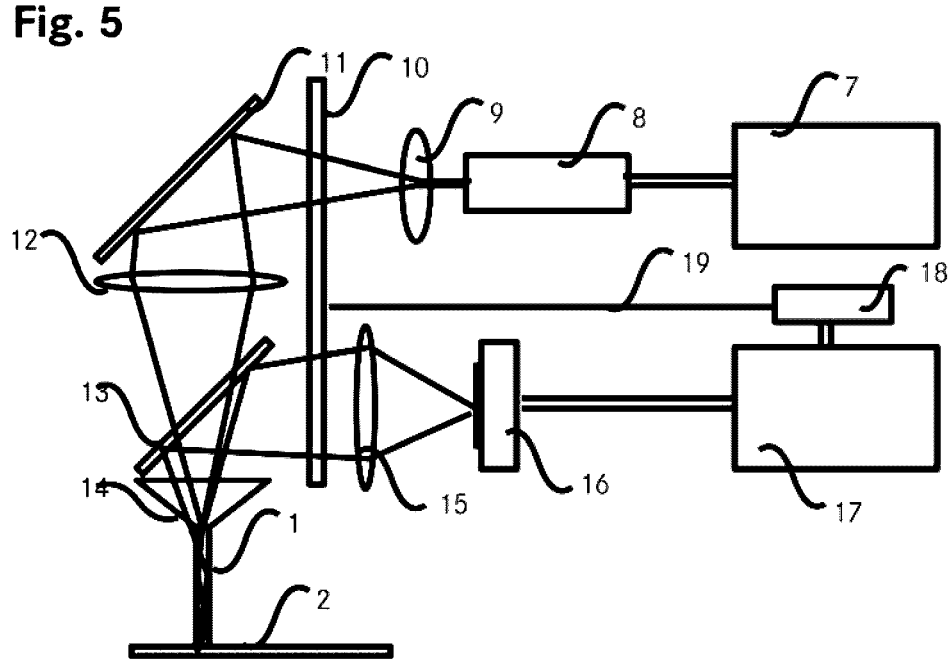

Fig. 6

METHOD FOR DETERMINING A POSITION OF A LIQUID JET

This application is a continuation of copending application Ser. No. 15/321,630, filed on Feb. 6, 2017, which is a National Phase application under 35 U.S.C. § 371 of International Application No. PCT/CH2015/000089, filed on Jun. 12, 2015, which claims the benefit under 35 U.S.C. § 119(a) to Patent Application No. 14405052.3, filed in Europe on Jun. 23, 2014, all of which are hereby expressly incorporated by reference into the present application.

TECHNICAL FIELD

The invention concerns a method for determining a spatial position of a liquid jet, in particular of a liquid jet for optically guiding a laser beam. Moreover, the invention concerns a device for implementing the method.

PRIOR ART

A method is known from EP 0 762 947 B1 (Synova) regarding how a laser beam for the machining of materials can be coupled into a liquid jet. In EP 1 833 636 B1 (Synova), the liquid jet is additionally surrounded by a gas jet, in order to stabilize the liquid jet. The improved methods make it possible, among other things, to work at increasingly larger spacings from the nozzle. Hence, the need arises for a precise determination of the position of the jet.

In JP 2009-262 163 A2 (Sugino) a method is described in which a CCD camera observes both the laser beam and the water jet upon impinging on a surface. But the purpose of the layout is to orient the two beams to each other and thus to establish the coupling of the laser into the liquid jet.

Also in DE 10 2010 011 580 A1 and DE 10 2012 003 202 A1 the liquid jet is measured, this time with two laser micrometers, which stand both perpendicular to each other and also perpendicular to the beam axis. It is also proposed, for example, to use only one measurement light source and one detector, which can be moved about the beam. In order to measure the position, the nozzle head is moved in height relative to the measuring device.

One cannot assume that nozzles can be fabricated and installed in a mathematically precise manner. In particular, if the nozzle needs to be replaced, or a new workpiece secured on an automatic processing machine, a liquid jet has to be measured once more, if its position and direction are required with high precision. The methods known from the prior art are either technically complicated or cannot be automated.

PRESENTATION OF THE INVENTION

The problem which the invention proposes to solve is to create a method belonging to the aforementioned technical field which makes it possible with the least possible technical expense to determine the position of a liquid jet, especially a liquid jet for optical guiding of a laser beam. The solution of the problem is defined by the features of claim 1.

According to the invention, the method for determining a spatial position of a liquid jet comprises the following steps:

a) A collision object having a measuring point is provided. The measuring point is suitable for interacting with a liquid jet.

b) The state of the liquid jet is detected in a first configuration between collision object and liquid jet.

c) The configuration is changed so that the state of the liquid jet changes.

d) The change between the first and second configuration is detected.

The method according to the invention creates the preconditions for a simple and fast positional determination (position or orientation) of a liquid jet. Furthermore, the method can be carried out with little technical expense, so that existing layouts can also be retrofitted with a calibration device.

The point of departure is a liquid jet which is generated by a nozzle (such as a laser processing machine guided by a water jet). The liquid jet should preferably be a contiguous, laminar jet. In particular, the liquid jet should be suited to guiding a laser beam along a certain length, such as a waveguide. A spray jet only consisting of a swarm of droplets is of no interest in this context. In the context of the invention, basically three different states of the liquid jet can be distinguished: the free state, the unperturbed state, and the perturbed state. However, there may also be states not primarily involving the external form of the liquid jet, but instead other properties such as the amount of radiant energy coupled in or the frequencies of this radiation.

In the free state, the liquid jet emerges from the nozzle and propagates under the ambient conditions (e.g., in the air) in free flight until it breaks up into individual droplets. In the unperturbed state, the liquid jet is unaffected in an imaginary (geometrical) measurement plane and has no interaction with the collision object. But it can be provided that the liquid jet impinges on a surface, preferably being substantially perpendicular to the longitudinal axis of the liquid jet, beneath the measurement plane and before it breaks up spontaneously into droplets. In this case, the liquid jet breaks off practically smoothly and with no deflection. In the perturbed state, the liquid jet collides (in the measurement plane) at least partly with the collision object, so that a perturbation (deflection, dividing and/or interruption) of the liquid jet results.

Thus, the basic notion of the invention is that the state of the liquid jet can be specifically altered with a collision object and the change in state in connection with a configuration change is observed. The smaller the configuration change between the first state on the one hand and the second state on the other hand, the more precisely can the position or direction of the liquid jet be determined. One of the two states can be, for example, the "perturbed" state, and the other can be "unperturbed" or "free". Yet other combinations of states can also be used.

The spatial position should be understood as follows in the context of the invention: it should encompass both the position of a suitable reference point and suitable directional vectors. Such a generally stated position of an individual object can be described in space by 6 parameters. For example, they can be the 3 spatial coordinates $(x,y,z)$ of the reference point and the 3 components of the chosen directional vector. Thus, for the liquid jet, the spatial coordinates of the exit opening of the nozzle and the direction of propagation of the jet can be used. The directional vector, of course, can also be described by 3 angles with respect to a suitable plane and a zero direction. For example, this could be the plane of movement of the nozzle and as the zero direction one of the boundaries of the work zone could be used, if it is a straight boundary.

For the liquid jet, one could use for example the position of the center of the nozzle exit as the reference point of the position and the direction of propagation of the liquid jet at the nozzle as the directional vector. Yet the position could also be given by a point on the tool head, which is not moving relative to the liquid jet. Likewise, an abstract point in space can be chosen. In the case of the collision object, a midpoint could define the position and directional vectors parallel to measurement edges a direction. But the measuring point can also be equally used for the position determination and other directional vectors can be chosen. Position and directional vectors must encompass the liquid jet or measuring point so that the measurements of the liquid jet or the measurement point can be detected in regard to these references. For example, one should be able to say that the direction of the liquid jet and the directional vector differ by a differential vector (dx,dy,dz) or that the measuring point is displaced by a vector (a,b,c) with respect to the position. The differential vector (dx, dy, dz) or the spacing vector (a, b, c) must then be known.

By "configuration" is meant in the context of the invention the position of liquid jet and collision object relative to each other. The configuration is therefore independent of the chosen system of coordinates. It can likewise be described with 6 parameters. Thus, for example, one can use the translation between the two positions and the rotation between the directional vectors.

In order to anchor the configuration in an external system of coordinates, another 6 parameters are needed. By "external system of coordinates" is meant here one that is defined independently of liquid jet and object. The origin of such a system of coordinates could be defined, for example, by a measurement instrument which is mounted at any given point in space. Or one of the axes of the system of coordinates could be defined by the vertical in a case when the directional vectors of liquid jet and object are independent of the vertical, e.g., because the machine as a whole is slanting. For machining of materials, one generally wants to have the position of tool to workpiece. Since the tool here is the liquid jet, the sought spatial position corresponds to the configuration when the collision object is used for measurement at the location of the workpiece.

An external system of coordinates together with the 6 required parameters results then when the positions of liquid jet and collision object are determined in this system. For example, this might be done with a camera system. With such data, one then also obtains the spatial position in this external system of coordinates. If the collision object or the liquid jet is displaced in only a few parameters with respect to the desired system of coordinates, then only this displacement needs to be known, of course.

In one preferred embodiment, always only one parameter of the configuration is changed after another. The other parameters remain constant. This greatly simplifies the evaluation of the measurements.

The change in the configuration can be detected in various ways. For example, it is possible to actually measure the change. One possibility for this is, for example, counters on step motors by which the configuration is changed. In the event of a change at constant speed or known motion pattern, a configuration change can also be detected through a time measurement. But it is also possible to detect the position of liquid jet and object, calculate the configuration from this, and compare this to the last configuration. This can be done for example with the help of cameras. If only certain parameters are changed, this knowledge can be utilized to measure only the specific change in these parameters. Such individual parameters are, for example, only the displacement of one or both reference points in the direction of a system of coordinates axis. But one can also establish the reference points in space and change one component of the directional vector by a rotation about the suitable axis.

There are various ways of determining and monitoring the state of the liquid jet. Several measurement methods shall be discussed below.

The configuration between liquid jet and collision object should be changed in such a way that in one configuration there is an interaction ("perturbation") between collision object and liquid jet and in another configuration no interaction or a different interaction. It does not in itself matter whether the liquid jet or the collision object or both are displaced or rotated. Since as a rule the liquid jet is utilized for the processing of workpieces and these must also be displaced with the desired precision relative to the liquid jet, it is advantageous to utilize the displacement mechanism which is already present anyway in the processing device. In the case of machines which work with a movable machining head, it is therefore advantageous to move the liquid jet. Otherwise, there are also machines which work with a stationary machining head and a movable workpiece holder (such as an x-y bench).

Alternatively, however, the collision object can also be moved in controlled fashion on a suitable micrometer bench. Other arrangements are also conceivable. It is important that the change in the configuration be large enough to accomplish a change in the interaction of collision object with liquid. At the same time, one should avoid large changes in configuration, or else the geometrical resolution will be reduced.

The collision object is a body with at least one measuring point. A measuring point is preferably a surface irregularity (typically a corner or edge) which can be placed in the liquid jet. But in theory any point on the surface of any given body can serve as a measuring point. Its position simply needs to be determined with sufficient accuracy. The possibilities of the measuring points are discussed at further length below.

The collision object need not be a single piece, but all surface irregularities present on it should be in a rigid mutual position. Otherwise, especially for measurements in the micrometer range, there is the danger that the measurement of the position will be unreliable.

Finally, the collision object can also be specially outfitted to detect states of the liquid jet. Thus, for example, one could also imagine collision objects having sensors, in order to detect flow and temperature changes in the gas in the immediate vicinity of the actual liquid jet or also the emerging electromagnetic fields of coupled-in radiation. Alternatively, the collision objects could also influence such properties so that their change can be measured at another point. Such changes are also forms of interaction.

In a preferred embodiment, the collision object has at least two measuring points for the interaction with the liquid jet, where the measuring points lie in different planes. At least two configuration changes are carried out in this case.

The planes are preferably oriented perpendicular to the direction of the liquid jet. But they can also be deliberately chosen such that the liquid jet passes through them at a particular angle of, for example, 70°. This is of interest, for example, when the particular angle needs to be verified or assured for the subsequent machining of a workpiece.

An arrangement of two or more edges at at least two different heights (or in two axial positions with respect to the liquid jet) enables the measurement of the orientation of the liquid jet in a measurement system of coordinates without having to move the device for production of the liquid jet and the collision object in the direction of the liquid jet (z-direction). This is of interest, for example, for a processing machine which only allows for an x-y displacement.

In one preferred variant, the at least one configuration change is performed in a direction exclusively transverse to the lengthwise axis of the liquid jet. The configuration changes therefore only take place as a displacement in an x-y plane and not in the z-direction (where the z-direction denotes the direction of the liquid jet).

In many applications the position of the jet at a fixed spacing from the nozzle which produces the liquid jet is required. On the other hand, for the full three-dimensional (3D) machining of a workpiece with the liquid jet, all three coordinates of a given machining point of the liquid jet need to be determined. The direction of the liquid jet in space should also be verified.

If the collision object has at least one edge in the desired z-axis spacing from the exit of the nozzle which generates the liquid jet, then only two further coordinates need to be measured, namely the two lying in the x-y plane. In the following it shall be assumed that the x and the y axis are perpendicular to each other and both are perpendicular to the z axis, which defines the "vertical direction".

The measurement is now done as follows: collision object and liquid jet are moved with respect to each other so that the liquid jet in one position impinges on the edge of the collision object. The change in state of the liquid jet is ascertained and the corresponding configuration in the direction in which the change in configuration has occurred. The direction of movement is changed so that it is independent in linear manner of the first movement direction. If the collision object has only one measuring point, it is rotated about an angle>0 (e.g., 90°) before the second configuration change is generated. If the object has two measuring points, the configuration change is directed at the second measuring point. In both instances, the liquid jet after the second configuration change (in the second movement direction) impinges on the desired measuring point. This event is recognized from the change in state of the liquid jet and thus also a second configuration is determined.

In this way, one can obtain two coordinates at a fixed spacing between nozzle and collision object.

In one preferred variant, the configuration of the jet and hence the angle position of the jet are determined in further axial positions of the collision object relative to the jet.

This measurement takes place analogously to the measurement in the x-y plane. In one variant, it is possible for the edge and the liquid jet to be displaced relative to each other in the z-direction until a change in state of the liquid jet is determined. This is possible, for example, when the angle between the z-direction and the direction (lengthwise axis) of the liquid jet exceeds a certain minimum value (of for example 10°, especially 20°).

The preferred measurement method is as follows: a first position in a first plane with constant z-position is ascertained with the above-described method for determination of the position in a plane. This, together with the known z, can be a two or three-dimensional position. Then the z-position is changed and the position in this second plane, parallel to the first plane, is measured. From the obtained data, one can now determine the orientation of the water jet in two or three dimensions.

This method presumes that the liquid jet is substantially straight. If the liquid jet is oriented vertically downward and there are no perturbing forces, it will be straight. If the liquid jet is oriented horizontally, it will differ in some circumstances in measurable manner from a straight line. The same holds true for the case involving an electrically charged jet, which is moving in an electromagnetic field, or where there are lateral gas flows. If the need exists for more support points, further measurements on further planes with constant z will be necessary.

In one specific embodiment, the configuration change will be accomplished by a displacement of the liquid jet. Thus, the collision object remains nonmoving.

In order to avoid mechanical loads and save on energy, the part having the lower weight will preferably be moved. At the same time, however, it is advantageous for the moving part involved in the measurement process to be the same one that is also moved during use (i.e., during the machining of the workpiece). Often, especially with 3D processing machines, it is the unit which produces the liquid jet, i.e., the machining head.

Alternatively, however, the clamping device or only the collision object can be moved, for example.

In a preferred embodiment, in order to determine a midpoint or a diameter of the liquid jet, the collision object is at first brought into interaction with a first measuring point on a first side of the liquid jet. After this, the collision object is brought into interaction with a second measuring point on a second side of the liquid jet. The second side is diametrically opposite the first side. Midpoint and diameter of the liquid jet can then be calculated from two resulting collision positions. The two measuring points lie in the same measurement plane with respect to the direction of the liquid jet.

In order for the measurement to be as accurate as possible, the state of the liquid jet must be determined with an adequately sensitive measurement method. Thus, it must be possible to detect even a slight perturbation (i.e., a minimal collision of the measuring point with the liquid jet). Suitable measurement methods will be described further below.

Since the mutual spacing of the measuring points and the spacing between the locations of the change in state of the liquid jet are known, the diameter of the jet results from the difference between these two measurement values. With this information and one of the positions of the change in state, the position of the midpoint of the jet can then be calculated.

In one preferred embodiment, a measurement light is coupled into the liquid jet and a back scattering, reflection or extraction of the measurement light is detected in order to determine the state of the liquid jet. The measurement light can be chosen from any desired frequency range of the electromagnetic spectrum, but it must be able to utilize the unperturbed liquid jet as a waveguide. The back scattering, reflection, or extraction will depend on the state of the liquid jet. Upon perturbation of the liquid jet by the collision object, the measurement light will be reflected or extracted differently (or not any longer) than in the unperturbed state.

This embodiment has the advantage of making it possible in a very simple and reliable manner to determine the state of the liquid jet or whether the liquid jet is perturbed.

The measurement light in a preferred variant is in the range of the infrared, the ultraviolet, or visible light. The index of refraction is wavelength-dependent. If the index of refraction of the liquid jet is $n_1$ and the index of refraction of the surrounding gas is $n_2$, then we must have $n_1>n_2$ in order to accomplish total reflection. The smaller the ratio $n_2/n_1$, the larger the acceptance angle at which the light can be coupled into the jet. Furthermore, the evanescence field decreases more quickly for smaller ratios and short wavelengths. It is therefore quite conceivable, in this application, to extract energy specifically from the evanescence field and measure it. In this case, a slowly diminishing evanescence field could also be advantageous. A "perturbation" could then be ascertained without the measuring point and liquid jet actually touching (optical tunnel effect). This would have the advantage that the measuring point would not be mechanically stressed. Since the liquid jet itself is not affected, it would also be conceivable to perform such a measurement at the same time as the machining of a workpiece. For this, radiation with two very different wavelengths could be coupled in, one being energy-rich, short-wave radiation of the material processing and the other a long-wave radiation for the position determination.

For a water jet in vacuum, one finds for example that wavelengths between 10 nm and 80 nm are not suitable, because then $n_1 < 1$. The usable wavelengths are bounded at the top by the diameter of the liquid jet. Furthermore, since a perturbation site is supposed to be able to be detected, the wavelength should at least be on the same order of magnitude as the perturbation site or the perturbations generated in the liquid jet. Therefore, radiation with wavelengths over 1 mm (microwaves, radio waves) are no longer of interest. For very short-wave radiation, the unperturbed liquid jet would already have a surface roughness that for the most part hinders reflection. Therefore, radiation with wavelengths shorter than an order of magnitude of 0.1 nm (medium X-rays) is also no longer sensible for this application.

Depending on the measurement method, all three states ("free", "perturbed", "unperturbed") or also only two states ("perturbed or free" and "unperturbed") can be distinguished. The measurement methods are described in detail below.

In a preferred embodiment, a measurement light is coupled into the liquid jet. In this way, a measurement light beam is formed.

In a preferred embodiment, one of the spatial positions is chosen such that the liquid jet impinges on a reflective surface, which lies substantially perpendicular to the direction of the liquid jet. In this way, at least part of the measurement light is coupled back into the liquid jet. The reflected portion of the measurement light is observed, for example above the nozzle, with a photodiode. An interaction of collision object and liquid jet or the disruption of the liquid jet is manifested by an extraction and thus the loss of the reflected measurement light.

Thus, with this method the two states "perturbed" and "free" can be distinguished from the state "unperturbed". The benefit is that the optical elements for the detection of the state of the liquid jet can be built into the machining head. Furthermore, the measurement method can be realized easily and advantageously. Light should be understood here to be electromagnetic radiation of any given wavelength, as long as it can be guided through the liquid jet and extracted therefrom when becoming perturbed.

Furthermore, the measurement electronics can be placed in the machining head producing the liquid jet. The collision object and also the workpiece clamping device are then free of additional sensors and electronic measurement elements.

It is also possible for the collision object to have several planar surfaces which are variously reflective of the light, so that the strength of the reflected signal may provide information about the position of the liquid jet.

In another preferred embodiment, the state of the liquid jet is determined acoustically or mechanically.

When the liquid jet impinges on the collision object, a particular noise is generated. This can be measured with microphones. Because the liquid jet is generated with a considerable pressure (typically more than 100 bar) in the nozzle forechamber, a force acts on the measuring point when it is struck by the liquid jet. This force can be measured mechanically. The difference between the "free"

state of the liquid jet and the "perturbed or unperturbed" state thus becomes distinctly measurable.

An acoustic sensor can be placed at a suitable distance from the collision object and liquid jet or also be connected directly to the collision object or other components.

For the mechanical measurement, the measuring point can be formed by a bendable element, so that the action of the force can be measured with a sensor (e.g., a pressure sensor or a vibration sensor).

Finally, it can also be detected with a light barrier whether the liquid jet is perturbed or not. If the liquid jet is perturbed at a certain height, it will no longer be present underneath, or it will be deflected.

In one special embodiment, the liquid jet in one of the spatial configurations impinges on a reference surface. The reference surface is offset with respect to a measuring point on the collision object in the direction of the liquid jet. That is, the reference surface is as it were beneath the measuring point and thus beneath the measurement plane.

In a preferred embodiment, between a free jet position in which the jet passes through the recess and a perturbed position in which the liquid jet interacts with the edge there is at least one planar surface, so that the liquid jet can impinge on this unperturbed. The reference surface is at least as large as the diameter of the liquid jet. This can be used, for example, to produce a reference signal, before or after the liquid jet is perturbed by the measuring point.

If the state of the liquid is optically measured, the reference surface will be made reflective. A laser beam guided in the liquid jet can then be reflected by the reference surface. For example, it may consist of copper or refined steel.

In this embodiment, the liquid jet when guided across the collision object adopts all three possible states: at the recess (or outside of the zone of interaction with the collision object) one has a free liquid jet. At the reference plane, the liquid jet is in the unperturbed state and at the measuring point (edge, corner, etc.) one has a perturbed state. The method for determining the state of the liquid jet can distinguish at least the perturbed from the unperturbed state. Preferably, however, a measurement method will be chosen that can distinguish all three different states.

One of the measurement methods presented below uses reflected light or another suitable electromagnetic radiation. In what follows, all suitable electromagnetic radiation shall be called light. Such light can be coupled into a liquid jet. If this jet is in the unperturbed state and impinges on a plane which is reflective for the light, light will be reflected back into the liquid jet and can be measured. For such a measurement method, a reflective plane is therefore important in order to clearly recognize the state "unperturbed".

For many measurement methods, the transition from the state "unperturbed" to "perturbed" is easier to recognize than that from "free" to "perturbed". Therefore, it is advisable to have a region on the collision object which delimits the state "free" from the state "perturbed".

In a special embodiment, a length of the liquid jet acting as an optical guide is determined in order to detect the first and second state of the liquid jet.

The length of the optical guide ends where the liquid jet (in free flight) begins to break up, or where it impinges (in the unperturbed or perturbed state) on a given reference surface or measuring point on the collision object.

This variant makes it possible, on the one hand, to distinguish between the free, the perturbed and the unperturbed state of the liquid jet. Even if there are several measuring points on the collision object at different height, they can be distinguished from each other. Furthermore, one gains information on the absolute (and not only relative) spacing in the z-direction between the nozzle generating the liquid jet and the measuring point of the collision object.

The length can be realized, for example, by a flight time measurement of a coupled-in laser pulse. But other methods are also feasible. For example, the liquid jet as a whole can be recorded with a CCD camera and after this the images can be evaluated. Another example is "optical coherence tomography".

In a preferred embodiment, short laser pulses are coupled into the liquid jet. The internal (back) reflections are observed. From this data, the position and/or type of the interaction between collision object and liquid jet can be determined.

The benefit of this measurement is that one obtains very detailed information about the liquid jet, so that besides the three states one can also obtain data on the light conductivity.

In the application for liquid-guided laser machining devices, it is conceivable to use the processing laser in greatly attenuated form (for example, to $\frac{1}{1000}$) also as a measuring laser. In order to achieve an adequate length resolution, the laser pulses must be accordingly short.

The data evaluation is somewhat more time-consuming than with the optical measurement methods described above. However, it is easily computer-assisted and is commercially available.

Similar to the method with the reflected measurement light beam, the entire sensor array and measurement electronics can be integrated here in the machining head of the machine (where are also located the optics for the processing laser and the nozzle for the liquid jet). Collision object and workpiece holder or work bench can therefore be passive.

In a preferred embodiment, magnitude and direction of the configuration change are determined by information on the positions and states in the first and second position. One determines the configuration change whereupon the liquid jet undergoes a change of state.

When any two measurements are carried out, it may happen that either no change of state can be observed (probably in the case of a slight displacement) or one has a spacing between the two positions which is larger than the required measurement precision.

In order to avoid this, the following procedure is proposed, based on a binary search:

One may basically presume that it is always possible, by manual adjustment or the use of old settings, to find two (sufficiently far apart) positions X1 and X2 with different states of the liquid jet. In the following, it shall be assumed that the state in position X1 is "unperturbed" or "free" and that in position X2 is "perturbed". Furthermore, for easier comprehension, it shall be assumed that the procedure for the configuration changes starts at position X1.

In order to find the transition between "unperturbed or free" and "perturbed" as efficiently and accurately as possible, the next state measurement is done at a position X3 between the first two positions X1 and X2. If the state at X3 is "perturbed", the position X2 is replaced by the new position X3 (case A). On the other hand, if the state at X3 is "unperturbed or free", the position X1 is replaced by the new position X3 (case B). The next measuring point X4 is now chosen in case A between position X1 and X3 and in case B between position X2 and X3. With this binary search procedure, one can specifically narrow down the position with the state change to the desired accuracy.

The configuration changes X1→X3, X3→X4 etc. all lie on the same straight lines.

The benefit with such a measurement method is that the sensor only has to be read out seldom and the position only has to be found at special points. One can even vary the accuracy of the position measurement and only move on to the full measurement precision in the last steps. The drawback is that there are many changes of direction and associated forces on the mechanism and potential waiting times during which the system has to be stabilized.

In another preferred embodiment, the state of the liquid jet is measured at regular intervals of time. The intervals of time can be attuned to the speed of the configuration change of collision object and liquid jet.

In order to find the position at which the liquid jet changes from the states "free" or "unperturbed" to "perturbed" or vice versa, one can also place the liquid jet at a suitable position and from there move with a suitable movement across the collision object so that the measuring points are contacted. During this movement, measurements are performed, preferably at a frequency which is adapted to the speed of movement so that the required measurement accuracy is achieved.

The benefit of this measurement method is that vibrations in the entire device and waiting times for the stabilizing of the device are largely avoided, since uniform movements are at most associated with minimal accelerations. The required time for a measurement is also fixed when the distance traveled is fixed. And the evaluation of the data can occur after the actual measurement. Qualitative comparisons, such as, for example, the reflection properties of different surfaces, are easier to perform.

In a special embodiment, the first spatial position of the liquid jet is chosen such that the liquid jet is not in a perturbed state (but instead in the state "free" or "unperturbed"). For example, the first position is chosen such that the liquid jet impinges on a reflecting surface such that measurement light guided in the liquid jet is reflected back into the jet at the end of the liquid jet. However, the first position may also be chosen such that the liquid jet is in the state "free".

This has the benefit that the first measurement determines the state of the free liquid jet. This measurement can be used as a test for the functional fitness of the device and the measurement instrument, since a comparison with known earlier measurement values can be made for this case.

Alternatively, however, the first spatial position can also be chosen such that the liquid jet strikes or contacts the collision object. An "unperturbed" liquid jet should be as easy to recognize in the measurement results as was the "free" liquid jet. However, there is yet another part involved in the measurement process in this case, namely, the collision object. If the jet strikes the collision object only partially, the interaction becomes more complicated. Therefore, this configuration is less well suited to the test mode.

In one preferred variant, the collision object is firmly connected to the workpiece clamping device of a processing machine with liquid jet-guided laser.

This prevents the position of the collision object from changing inadvertently. And the clamping device and the liquid jet producing system are generally fixed in position relative to each other in practice. But as an alternative it is also possible to fasten the collision object directly on the workpiece.

In a preferred application, there are reference lines, templates or gauges with which it can be determined quickly and precisely whether the liquid jet has the desired orientation.

With the above described methods, a liquid jet can be surveyed very precisely and thus also oriented and calibrated very precisely. In the actual process of use, calibration and orientation should often be checked without having to carry out the full process each time. The goal is a checking and not an actual surveying. If the check reveals that the liquid jet is no longer adequately calibrated, the complete calibration process should be performed.

Such tests are typically carried out with the aid of references such as lines, templates, or gauges. For example, one can imagine the processing laser being reduced in intensity and the liquid jet being directed into a test gauge or template at a defined position. Now, if an interaction occurs between the gauge or template and the liquid jet, the adjustment is wrong. This interaction can be detected like the interaction with an edge on the collision object. Depending on the sensor and the measurement method, extras such as a reflecting or pressure-sensitive surface will be required.

Whether the liquid jet follows a given line or strikes a required point can be checked by eye or with a camera. Other sensors are also conceivable.

In one preferred variant of the method, at least one of the configuration changes is a displacement less than 10 micrometers, especially one not larger than 1 micrometer.

This is the accuracy with which a liquid-guided laser is utilized. The adjustment should allow the instrument to be used in the best possible way. Alternatively, of course, a less precise adjustment can be undertaken. This speeds up the measurement process. A more precise adjustment is also possible, if the fabrication of the collision object and the controlling of the configuration change allow this.

In one preferred embodiment, the collision object has at least one sharp edge which serves as the measuring point.

The edge should be sharp, that is, it should have a radius of curvature which is smaller (especially at least ten times smaller) than the diameter of the liquid jet. The measuring point can be used as a reference for a system of coordinates in which the position of the liquid jet is determined.

The measuring point can also be formed at the site of two meeting edges, i.e., in a corner of the collision object.

The edge can but need not be pointed. That is, the abutting surfaces of the collision body preferably make an angle of not more than 90° with each other. The edge can but need not be straight. For example, it can also be curved into a circle.

If the measuring point is a corner or tip on the collision object, the angle of the corner for example is not greater than 120°, or not greater than 90°.

There can also be formed two, three or four (or even more) measuring points on the collision object in the form of edges or corners. Preferably, two definitely spaced apart measuring points are used for each spatial direction. The liquid jet is then first brought into collision with the first measuring point and next with the second measuring point diametrically opposite the first measuring point. The defined spacing of the two measuring points can lie for example in the range of 1-5 cm.

A sharp edge permits a reliable determination of the position at which the state of the liquid jet changes. Since various spatial dimensions are advantageously measured successively for the multidimensional position determination, the measurement points (edges) should have a sufficient length, for example at least five times, in particular at least twenty times the diameter of the liquid jet.

Using this, it is also possible to perform the measurement with a liquid jet, the position of which is only known imprecisely. This is because there is an edge extended in one dimension in this case and the striking line is correspondingly large.

However, the edge may also be fabricated to be less sharp. However, the edge profile then needs to be known for a good measurement. If the edge extends parallel to the liquid jet lengthwise axis, the interaction point and, in particular, the precise position thereof also depends on the angle with which the liquid jet impinges on the edge. However precisely this angle is still unknown at the start of the measurement. Therefore, the evaluation of the measurement data becomes significantly more complicated.

In a further preferred variant, a body comprises a plurality of edges. In particular, it is useful to have two edges which span the base plane of a desired coordinate system. This base plane is typically either the plane perpendicular to the lengthwise axis of the liquid jet or the plane parallel to the clamping device. However, this may also relate to a different plane. The aforementioned base plane may also be considered to be the measurement plane, in which the collision of the liquid jet is monitored.

In a further preferred variant, the body has a total of four edges, of which two lie parallel to one another in each case and the non-parallel edges span the plane. The distance between the parallel planes should be known with sufficient precision. This allows the diameter of the liquid jet and the midpoint thereof to be determined without displacing the collision object. The method is explained in detail further below.

In a further preferred variant, the collision object has a total of six or more edges. In this case, four of the edges form the arrangement described in the preceding paragraph and define a first plane. The other edges are arranged outside of the first plane, but parallel thereto. Here, care is taken that the collision object can be assembled in such a way that the liquid jet can impinge on all edges and edges are not covered by other edges. Because the position of all edges in relation to one another is known in all spatial dimensions (for example, in relation to a predefined measurement system of coordinates), such a collision object allows determination of a working point of the liquid jet in all three dimensions or else the spatial direction of the liquid jet. Here, it is sufficient to displace the collision object or the liquid jet in two spatial directions only.

In a preferred variant, the collision object in one of the spatial configurations has a recess for the free passage of the liquid jet. The liquid jet is led through this recess in one of the spatial configurations. At first, the liquid jet can be roughly positioned, so that it passes freely through the recess. After this, the desired number of configuration changes is produced in order to bring the jet into contact with one or more measuring points of the collision object. The measuring points may lie in a different plane than the recess. They may extend into the free region of the recess or be set back from it.

The measuring points can be placed in pairs at opposite sides of the recess.

Since the liquid jet upon interacting with the collision object loses at least a part of its liquid, the collision object should be shaped so that the liquid can drain off promptly. A buildup of liquid on the surface of the collision object in the region of the measuring point may disturb the interaction behavior with the liquid jet.

A device according to the invention for carrying out the method comprises a collision object for the interaction with the liquid jet, a displacement device for generating a predeterminable configuration change between liquid jet and collision object, and a device for detecting a first and second state of the liquid jet in a first and second spatial configuration. The first state here is measurably different from the second state on account of a changed interaction between collision object and liquid jet.

The device according to the invention can be part of a processing machine. The processing machine includes a device with a liquid nozzle for generating a positionable liquid jet. Furthermore, there is preferably present a laser beam coupling unit for coupling a laser beam into the liquid jet. The laser coupling into the liquid jet can be done as described in EP 0 762 947 B1 (Synova).

The collision object is for example a shaped piece of metal with at least one edge for the interaction with the liquid jet. The shaped piece can be for example a frame with a central recess. On the frame, one to four measuring points can be formed. Preferably, every two measuring points lie opposite each other on an axis in the x- or y-direction.

The collision object can also have measuring points on different levels. The recess can be arranged on a plane separate from the measuring points.

The collision object for example has a tip or corner for interaction with the liquid jet. The tip forms a measuring point. The tip is for example formed in a platelike or framelike part of the collision object in the form of an arrowhead. The platelike part is preferably oriented perpendicular to the direction of the liquid jet, that is, the tip stands crosswise to the liquid jet.

In a special embodiment, the device has an optical unit for the coupling of measurement light into the liquid jet, so that the measurement light beam is guided through the liquid jet in the manner of a waveguide, and so that the state of the liquid jet can be determined with a suitable measurement. The frequency of the measurement light can be any suitable one from the electromagnetic spectrum. Depending on the choice of material and the measurement method, this is a radiation with a wavelength in the order of magnitude between 0.1 nm and 1 mm.

The collision object can have a platelike or framelike part, on which at least one measuring point is formed. The mentioned part defines for example a measurement plane of the device. There can also be several platelike or framelike parts with corresponding measuring points arranged at different heights.

In another embodiment, a reflective surface is provided in rigid spatial position with respect to the collision object, which is suitable for coupling at least a portion of the measurement light backward into the liquid jet. The surface defines a reference plane and is typically provided on the collision object itself. It has a rigid spatial reference to the measuring points on the collision object.

The reflective surface advantageously lies behind a measurement plane of the device, looking in the direction of propagation of the liquid jet. But it is also possible to place the reflective surface in the measurement plane. For example, the measuring point can be realized by a slot or an indentation in a reference plate. When the water jet passes from the reference plane to the slot, the state of the water jet changes, which can be detected for example with measurement light which is coupled into the water jet.

The collision object can be a separately manipulated element of the invention. It is characterized in having at least one measuring point, especially at least one sharp edge, and being suitable by virtue of its precise fabrication and material for a method according to the invention. The measuring point can also be another surface irregularity. In cross section, for example, the measuring point can also have a rectangular shape or an obtuse angle, besides the acute angle. The collision object can furthermore have one or more of the already described features:

a recess suitable for the passage of a water jet;

a plurality of, especially four, measuring points for the interaction with a liquid jet;

a reference plate, which is reflective for a measurement light guided in the liquid jet;

two or more measurement planes with corresponding measuring points (for example, at least two measuring points per measurement plane);

fastening means for attaching the collision object to a workpiece holder; the fastening means can be threaded boreholes;

positioning elements (grooves, ribs, etc.) for the micrometer-precise positioning of the collision object on the workpiece or the workpiece holder.

Further advantageous embodiments and combinations of features of the invention will emerge from the following detailed description and from the totality of the patent claims.

BRIEF DESCRIPTION OF THE DRAWINGS

The drawings used to explain the sample embodiment show:

FIG. 1a-c The three states of the liquid jet.

FIG. 2a-f Sample embodiments of the collision object with all measurement edges in one plane.

FIG. 4a-b Basic layout of a machine for workpiece processing by a laser guided by a liquid jet.

FIG. 5 An embodiment of a measurement system in which the processing laser is used to measure the state of the liquid jet.

FIG. 6 Intensity of the reflected light as a function of the configuration of liquid jet and collision object.

Basically the same parts in the figures are provided with the same reference numbers.

WAYS OF IMPLEMENTING THE INVENTION

Figure 3A:
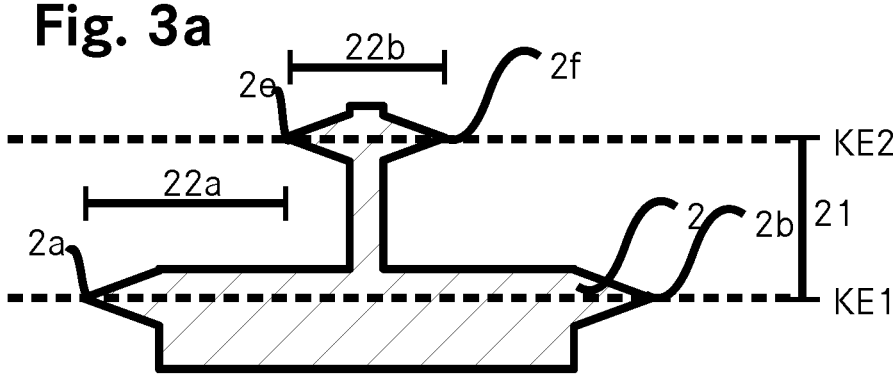
FIG. 3a-c Sample embodiments of the collision object with measurement edges on two planes.

FIG. 1a shows schematically a liquid jet 1 in the free state. The jet is produced by a nozzle, which is designed so that a laminar jet is created. The liquid jet 1 can be surrounded by a gas jet for purposes of stabilization in known manner. Thanks to its laminarity, the liquid jet can serve as an optical guide for a material-processing laser beam, if the liquid is water for example. At a certain distance (for example, one hundred times the diameter of the liquid jet), it breaks up into individual droplets and is thus no longer able to serve as an optical guide, for example (further details on the length of the liquid jet can be found for example in EP 1 833 636 B1 (Synova)). In the following, only that portion of the liquid jet which is laminar will be considered.

FIG. 1b shows the situation when the liquid jet 1 impinges on an edge 2x of a collision object 2. Even if the edge 2x only penetrates slightly into the liquid jet 1, it will become deflected. If the edge 2x penetrates further into the liquid jet 1, the jet will sooner or later fall apart. For example, droplets become detached from the liquid jet 1 and the jet loses its laminarity. The state of a liquid jet 1 which has been altered by an edge shall be called hereinafter "perturbed".

In FIG. 1c the liquid jet 1 impinges entirely on a plane surface 3x of a collision object 2. The jet 1 thus comes to an end and breaks up into droplets, forming a layer of liquid on the plane surface 3x. This state of a liquid jet 1 shall be called hereinafter "unperturbed" (one might also say "specifically limited").

In theory, any collision object 2 which touches a liquid jet 1 will perturb it. However, for a precise measurement which should also be as insensitive as possible to uncertainties in the angle of incidence 31 of the liquid jet 1, sharp edges 2x are recommended as measuring points. If a precise positioning is desired, the collision object 2 should be deformed as little as possible under the pressure of the liquid jet 1 or other effects. Therefore, the collision object 2 will be made as massive as possible, so that all measuring points on the collision object 2 have a rigid relation to each other.

FIG. 2a shows a cross section through a simple collision object 2 and a top view. This is an edge 2a which is secured by a spacer at a certain spacing from a base surface. The edge 2a has an acute angle in cross section (that is, the abutting surfaces make an angle of at most 90°) and it has in one direction (in FIG. 2a: perpendicular to the plane of the drawing), which is substantially perpendicular to the later direction of propagation FS of the liquid jet 1, a certain extension of, for example, at least ten times the diameter of the liquid jet 1.

For the measurement, the configuration change in BE occurs as perpendicular as possible to the direction of extension and substantially perpendicular to the direction of propagation FS of the liquid jet 1. This direction is hereinafter called the "measurement direction".

The sufficiently large extension makes it possible to achieve an interaction with the liquid jet 1, without having to know exactly its position in the direction of extension.

If one detects a perturbation of the liquid jet 1 by the edge 2x, one gains the following information from this: one portion of the jet 1 is situated in a configuration whose coordinate in the direction of extension is, however, unknown. With a similar measurement, the configuration can be determined in a second direction, which is substantially perpendicular to the liquid jet 1 and which defines with the first direction a plane. This can occur either by a rotation of the collision object 2 by an angle not equal to n×180° (n: whole number and zero) about an axis which is substantially parallel to the direction of propagation of the liquid jet FS, or by a second edge 2b on the collision object, making an angle with the first edge 2a not equal to n×180°. The second coordinate can be determined in this way. It should be noted that the same site on the liquid jet 1 is not of course determined during the second measurement (because the contact points of the collision object 2 on the envelope surface of the liquid jet 1 are rotated relative to each other).

For practical reasons, one is often more interested in the midpoint of the jet and its cross sectional diameter than a boundary surface of the liquid jet 1. In order to measure the midpoint and the diameter, further measurements are needed. A typical method is to measure along the same measurement axis an interaction on a first side of the liquid jet 1 and an interaction on the opposite, second side of the liquid jet 1. The difference between the known distance between the two interaction positions (22a, b) and the measured distance between the two interactions (23a, b) is equal to the jet diameter in the direction of the measurement axis. The assumption is made here that the jet 1 impinges perpendicularly on the plane KE of the two measurement edges used (of course, this can also involve only one displaced edge). It shall be explained later on how this angle of incidence 31 can be measured. With this knowledge, the required corrections can then be made, if the jet diameter is required with such precision.

Thus, at least three measurements are needed to measure a position of a jet 1 with round cross section. A collision object 2 with only one edge 2a must be rotated twice for this (namely, by an angle between 0° and 180°, such as 90°, and by 180°).

The rotation of the collision object 2 and/or the liquid jet 1 can be avoided by using a collision object 2 having at least three edges 2a-c in the required arrangement to each other (0°, 0°<x<180°, 180°).

FIGS. 2b-f show additional forms of the collision object 2. Two edges 2a, b lie opposite each other and are therefore recognizable in the cross section. A third edge 2c can be arranged differently, thus producing different top views. FIGS. 2b-f show two possibilities each time. The first is a wholly symmetrical top view, square or rectangular. This has the advantage that the measurement edges 2a-d are relatively long, so that a measurement can be performed even with only slight prior knowledge as to the configuration. A polygon has the advantage that the cross sectional shape of the jet 1 can be measured more precisely, but the drawback that the edge length decreases and thus one must already have a quite accurate estimate of the configuration. A cross shape or a corner (a cross divided in the diagonal) has the advantage of relatively long edges, yet requires only a slight surface. It is advantageous for the collision object 2 to have only a slight surface, as then the impinging liquid can drain off easily.

The edges 2x are each fixed to spacers. These spacers need to be stable and firm enough to hold the edges 2x in position even during measurement conditions. The spacers can have any given diameter and consist of any suitable material for this. They can be massive or hollow and also have fastening features such as, for example, a thread. But such fastening features need to be designed so that they do not affect the measurement. Liquid must thus be able to drain off suitably and the fastening features should not impair the edges 2x and should also be sufficiently far away from the edges 2x that they cannot be confused with the edges 2x in the measurement results. The spacers should hold the edges 2x far enough away from the fastening plane that the deflection and perturbation of the jet are sufficiently distinctly identifiable for the measurement method used. Just how large this spacing is will depend on the measurement method, the jet 1, the edge aperture angle and the interaction between material and liquid and it will presumably be best determined by experiments.

FIG. 2b shows a very simple collision object 2 with four edges 2a-d. The object is symmetrical about its vertical axis. The edges 2a-d lie around the spacer on the outside. This allows a stable and precise fabrication. The drawback is that exterior edges 2a-d are somewhat subjected to wear during use and constitute a certain risk of injury in their handling.

FIG. 2c is a modification of FIG. 2b, in which a reflective reference surface 3 is provided additionally. This is situated on a different level (namely, on a lower plane) than the measurement edges 2a-d. In FIG. 2c, it extends across the entire region lying beneath the measurement edges 2a-d. Thus, there is a reflective surface beneath each edge 2a-d used for the measurement. The reference surface 3 brings advantages for different measurement methods.

Another embodiment is shown in FIG. 2d. Here, on the one hand, the edges 2a-d are not symmetrical in cross section. This means that the method is not limited to symmetrical edges. All other asymmetrical edges are also possible. As already mentioned above, no edge at all is actually required. Edges are merely preferred on account of their ease of measurement. If one uses a measurement method requiring a reflective reference surface 3, this can also be arranged on top on the collision object 2. In this case, however, either the reflective material 3 must start right at the edges, or one will totally abandon the edges 2x and only use one reflective surface 3 of known dimensions. In either case, however, the measurement method is made more difficult, since now the start of a gradual rise in the signal needs to be recognized and not a sudden drop or a local minimum. Presumably, therefore, this method requires a finer sampling in connection with the collision object 2 described in FIG. 2d in the variants with reflective surfaces 3 in order to achieve a comparable resolution. Alternatively, the collision object 2 of FIG. 2d can also be arranged on a reflective surface 3, similar to FIG. 2c). The edges 2a-d would then appear as a local minimum in the intensity in a measurement method making use of reflected measurement light.

The top view can be chosen from one of the above described variants.

In FIGS. 2e and 2f, the collision object 2 is substantially framelike. This means that a central free space 100 is present, surrounded by four measurement edges 2a-d. The measurement edges 2a-d thus lie on the inside of the framelike collision object 2. The outside of the collision object 2 has no technical measurement function.

FIG. 2e shows a variant without reflective surfaces 3. The discussion on the arrangement of the edges 2x is similar to that in the description of FIG. 2b. In the cross top view, squares provided here with edges 2x project into the free space 100. The squares do not touch each other. Each square has three edges, which are suitable as measurement edges 2x. Two of these, 2a, b, lie opposite each other. In order to have the minimum number of edges, two square arranged diagonally are thus sufficient. However, a symmetrical body is preferred. The spacer here now has the form of a frame. In regard to the fabrication and the properties and the size, the same requirements apply as for FIGS. 2a-d.

FIG. 2f finally shows the supplementing of 2e with the reflective reference surface 3. Here, the reflective reference surface 3 now lies underneath the free space 100 and thus inside the collision object. It has an opening 101 for example at the center, to allow liquid to drain off without hindering the measurement.

With the above described forms, one can determine the configuration of liquid jet 1 and collision object 2 in a plane, the plane being the one subtended by the configuration change. This plane is hereinafter called the "plane of motion" BE. Now, it may be of interest to also ascertain the angle position of the liquid jet, i.e., the angle between liquid jet and plane of motion BE, which we shall call hereinafter the jet angle 32, and the angle between edge plane KE and liquid jet, i.e., the angle of incidence 31.

The liquid jet 1 does not always impinge perpendicular to the plane of motion BE_D of the jet producing element. Neither is it certain beforehand that the edge plane KE is parallel to the plane of motion BE_G of the collision object 2 (case 1). Moreover, it is possible that the plane of motion of the jet-producing element BE_D is not parallel to the edge plane KE (case 2). Of course, different effects may accumulate.

The angle position of the liquid jet can thus be determined by four angles:

(a) by the angle between the plane of motion of the jet-producing element BE_D and the liquid jet FS in a direction in the plane of motion BE_D. This is the one jet angle 32.1. (Or, if the object is moving, the angle between the normal to the edge plane KE and the plane of motion of the collision object BE_G)

(b) by a second jet angle 32.2 in a second direction, so that the plane of motion BE is subtended;

(c) the angle between the normal to the edge plane KE and the direction of propagation of the liquid jet FS in a direction in the plane of motion BE. This is an angle of incidence 31.1.

(d) by a second angle of incidence 31.2 in a second direction, so that the plane of motion BE is subtended.

In the following, for the sake of simplicity, only the angle measurement in one direction will be discussed and only the case when the actual position measurements are performed by displacement of the liquid jet. The collision object may be displaced, but only to reposition the edges, not to perform the actual measurement. Thus, a collision object 2 with only one edge 2a can take on the role of a collision object 2 with three or more edges 2x on several edge planes KE. Or a collision object with edges 2a-d in only one edge plane KE can change the edge plane KE and thus make possible the complete measurement. The measurement in the other direction works the same way. The measurement method in which the collision object is displaced for measurement purposes likewise works the same way.

Figure 7A:
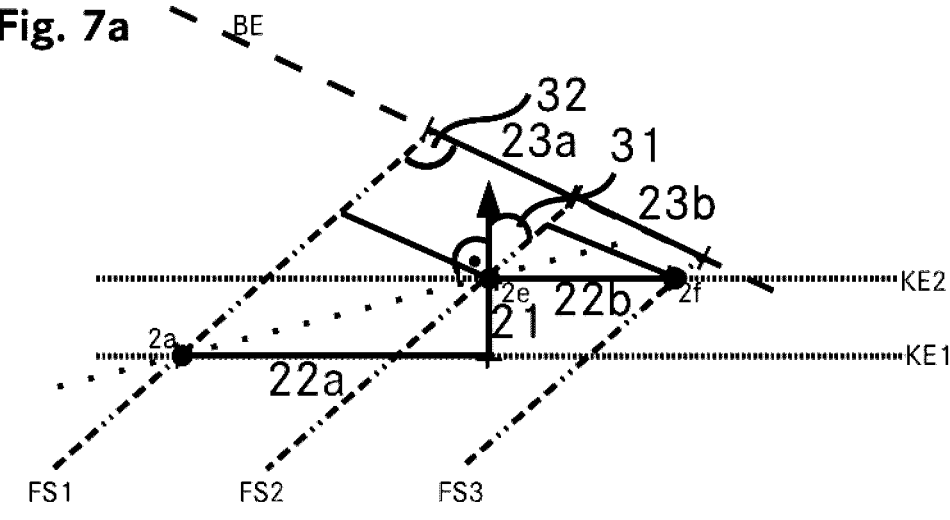
FIG. 7a-d Geometrical diagrams to show the interpretation of the measurement results.

The measurement method and the evaluation of the measurements is described by means of FIG. 7a)-e) in two dimensions. This makes it clear that all desired angles and thus all values which are needed in order to switch to any given device system of coordinates can be determined by surveying three suitable points. The following data will be required: the spacings (22a,b) of the three points (2a,e,f) from each other along a straight line (KE), which is defined by two of the points (2e,f), and the spacing of the third point (2a) perpendicular to this line (21), and the displacement of the jet-producing element between the measurement signals indicating an interaction between liquid jet and edges (23a, b). For the angle determination, it is not necessary to reckon with the midpoint of the liquid jet. But one must then make sure that always the same part of the envelope surface of the liquid jet 1 initiates the interaction.

A simple way of obtaining the necessary measurement data precisely and with the least possible adjustment of the experimental layout is to use a collision object 2 having several measurement edges 2x, every two of which lie opposite to each other (such as 2a and 2b or 2c and 2d). In the first measurement plane KE1 preferably four measurement edges (2a, b, c, d) are situated. There will be a similar arrangement in a second measurement plane KE2.

Instead of using two oppositely situated edges each time (pairs of edges), subtending an edge plane KE, there can also be only three edges per edge plane, only two of them being opposite each other. The third one subtends the edge plane KE with the two first edges. The edge pairs can also be avoided entirely in the second edge plane KE2. Finally, it is also possible to not use any edge pairs at all, but instead only four measurement edges, which subtend two different parallel planes KE1 and 2 only by a rotation of the object. But in this latter case, the jet diameter and its midpoint can then only be determined with the help of a rotation of the collision object or the jet-producing element. If only a single measurement edge is provided, correspondingly more position changes are needed, since all required edge positions have to be measured with the aid of this one edge.

Figure 3B:
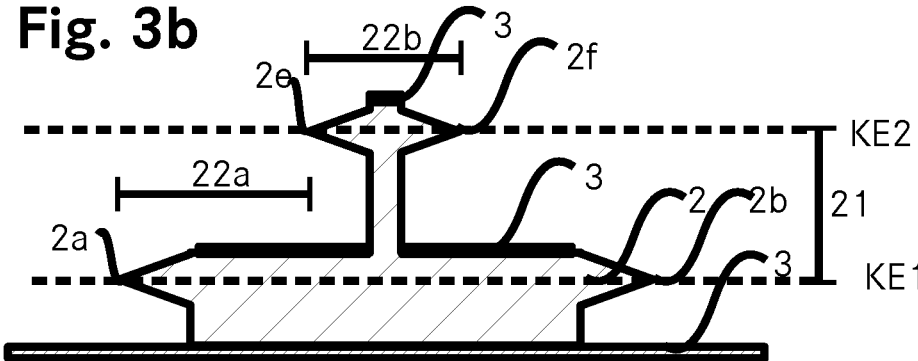
Figure 3C:
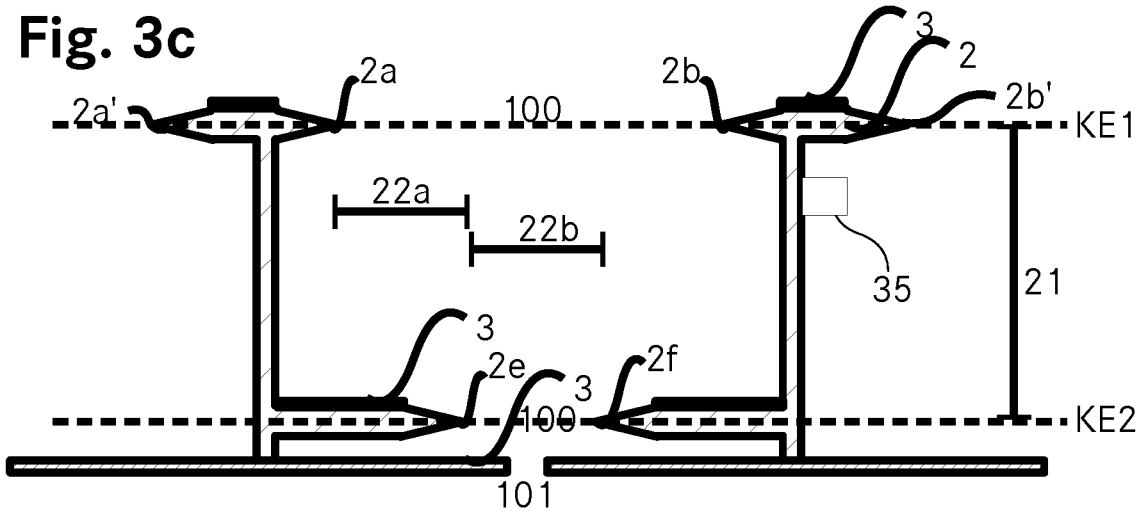

Three sample embodiments for collision objects 2 which have a sufficient number and suitable arrangement of measurement edges 2x to perform all necessary measurements without displacement and rotation of the collision object are shown in FIG. 3a-c.

FIG. 3a shows a form which is suited only to measurement methods not relying on reflective surfaces. FIG. 3a shows only the cross section. The top view can be chosen similar to the examples and variations in FIG. 2 and the explanations for these figures.

The collision object 2 has two parallel edge planes KE1 and KE2, each of which is formed by 3 to 4 edges 2x. The edges 2a-d of the lower edge plane KE1 lie further apart from each other than the edges 2e-f of the upper edge plane KE2. The spacing in the direction of the edge plane between the edges of the upper plane KE2 and those of the lower plane KE1 should be of such a size that all edges 2x can be detected as such, that is to say for all angles of incidence 31 to be assumed by the liquid jet 1. The spacing should typically be larger than a jet diameter and preferably larger than 10 jet diameters. Hit the surface in front of the edge. This gives the following minimum spacing '22a'$_{min}$:

$$'22a'_{min} = \frac{\sin('31'_{max})'21' + d}{\cos('31'_{max})}$$

Here, d is the diameter of the liquid jet and '31'$_{max}$ is the largest angle of incidence to be assumed. Any desired form of fastening of the edges 2a-d to the spacer can be chosen, as long as the interaction with the edges 2x can still be determined unambiguously. The spacer makes sure that the interaction at the edges 2a-d) of the edge plane KE1 is so pronounced that it can be measured before the perturbed jet impinges on any base which may be present. For this, on the one hand the spacer must be tall enough and on the other hand slender enough for the deflected jet not to be able to collide with the spacer before its deflection can be measured. The spacer, the edges and the fastening of the edges must be stable enough so as not to bend excessively under the liquid jet or for other reasons change the positioning of the edges (21, 22a,b) relative to each other more than the desired measurement precision. The spacer should not reach so far across the edges that they are prevented by the spacer from interacting with the liquid jet at an expected angle of incidence 31. This requirement also holds for the spacing between the edge planes KE1 and KE2. If the spacer or the spacing of the edge planes is very large, the spacing of the edges in the edge plane must be adjusted accordingly.

FIG. 3b shows a variant which is suited to measurements relying on reflective surfaces 3. Here, there is a reflective surface 3 underneath the collision object 2 as a reference plane. A second reflective surface 3 is situated on the surface between the edge plane KE1 and KE2. Finally, there is yet a third reflective surface 3 on the fastening of the upper edges 2e-h. This is one way of checking, for example, that the liquid jet 1 has also in fact measured the upper edges 2e-h as desired. But this reflective surface 3 can also be dispensed with. The other reflective surfaces may also be reduced. They need not cover the entire surface of the edge fastening. For a good measurement, only the transition from reflective surface to measurement edge needs to be measurable. In one embodiment, the entire collision object consists of reflective material. In another embodiment, it is completely coated with reflective material, but the relative position of the edges continues to be precisely known. For the spacer, the same applies as in FIG. 3a.

FIGS. 3a and 3b have the measurement edges 2x on the exterior. Of course, it is also possible to arrange the measurement edges 2x on the inside. This is shown in FIG. 3c. Besides the inwardly pointing measurement edges 2a-h on two different edge planes KE1 and KE2, two edges 2a' and 2b' are also shown on the exterior. These simply offer more measuring points and can thereby make possible a more exact measurement. But they are not necessarily used and can also be omitted.

Instead of this, however, the inner edges 2a and 2b of the same edge plane KE1 could also be omitted. If the outer edges 2a',2b' are omitted, the lowermost reflective surface 3 can be chosen to be smaller. The reflective surfaces 3 on the fastening of the uppermost edge plane KE1 can likewise be omitted. If it is present, check values can likewise be obtained in this way. For example, one could reflect the length of the distance with the measurement light, compare it in measurement and in theory, and thereby identify gross errors in the orientation.

FIG. 4a, b illustrates the measurement procedure. FIG. 4a shows the case where the liquid jet-producing element 4 (such as the machining head of a machine) can be displaced. The workpiece 6 lies on a workpiece holder 5. Fastened to this is the collision object 2, serving for the calibration. Alternatively, the collision object 2 may also be fastened on the workpiece 6. Other possibilities are a micrometer bench or a position on the other side of the clamping device 5. Finally, it is also possible to suitably design the outer edges of the clamping device itself or parts thereof. In any case, however, the liquid jet must be able to reach the collision object and this before the liquid jet falls apart, as shown in FIG. 1a.

With suitable dimensioning of the collision object 2, the workpiece 6 and the mounting of the collision object 2, however, it is not absolutely necessary for the liquid jet-producing element 4 to move in more than one plane. But it should not be a plane in which the direction of propagation of the liquid jet FS lies.

In FIG. 4b the jet-producing element is held stationary and the clamping device 5 is moved with the collision object 2 fastened to it. Alternatively, the collision object 2 may also be fastened to the workpiece 6 and the latter moved.

If the collision object 2 is fastened on a micrometer bench or some other fastening with which it can change its position, then only the collision object 2 can be moved and the liquid jet 1 and clamping device 5 and workpiece 6 remain fixed.

In all cases, the possible relative movement must be large enough and the positioning of the collision object 2 chosen such that all necessary measuring points on the collision object 2 can be detected or brought into interaction with the liquid jet 1.

FIG. 5 shows a possible embodiment of a measurement system utilizing the reflection properties of the collision object 2. In what follows "light" means any electromagnetic radiation which can be guided in the liquid jet 1. This is typically radiation in the wavelength region in the order of 0.1 nm to 1 mm.

A light source 8, preferably a laser and preferably the laser which is also suitable for a workpiece machining, is operated with the aid of a voltage source 7. By a lens 9, the light beam from the light source 8 is expanded. The expanded light beam is guided in measurement mode through a filter of a filter wheel 10 in order to attenuate it. Therefore, the collision object 2 is not destroyed by the measurement. If the light source 8 is not a laser, or if the laser cable is small enough, the expansion lens 9 and the filter are not necessary and can be omitted.

The light beam is guided by a deflecting mirror 11 into a lens 12, which has its focus on the nozzle of the liquid chamber 14. After the lens 12, the light beam passes through a semi-transparent mirror 13, which attenuates the light incident from above as little as possible. However, it is also possible to use this mirror 13 in place of the lens and filter combination (9,10) in order to attenuate a high-power laser. The light is thus focused within the liquid chamber 14 (shown only schematically) in the nozzle inlet and thereby coupled into the liquid jet. The precise shape of the liquid chamber, the liquid nozzle, gas inlet and gas nozzle can have various designs and are not part of this document. But the result of these components is a liquid jet 1 which is suitable as a light guide.

The liquid jet 1 acts like an optical fiber and guides the light beam. When the liquid jet 1, as in FIG. 1a, breaks up into droplets, the light is extracted and there are practically no reflections back to the liquid chamber. If the liquid jet 1 impinges on an edge, as in FIG. 1b, the light is also extracted on account of the deflection and there are hardly any backward reflections.

But if the liquid jet 1 strikes a reflective surface 3, the greater portion of the coupled light is reflected and goes back through the liquid jet 1 to the liquid chamber 14. Here, the light is extracted from the liquid and impinges, now from the bottom, on the semi-transparent mirror 13. This guides the reflected measurement light through an empty opening in the filter wheel 10 onto a lens 15, which in turn focuses it onto a photodetector 16 (such as a photodiode). The filter wheel 10 can also be equipped in this position with a filter which for example minimizes scattered light or protects the measurement electronics.

The photodetector 16 is connected to electronics 17. In the present variant, this can furthermore control the filter wheel 10. The filter wheel 10 should be placed in the proper position each time in the measurement mode and in the processing mode. Alternatively, voltage supply, readout electronics, memory, control unit for the sensor and for the filter wheel can also be separate and accommodated at different locations or made possible by other mechanisms. The readout method for example can simply determine the crossing of a threshold value or plot the variation in the signal voltage. But it is also possible to carry out runtime analysis for pulsed lasers or work with a lock-in amplifier and a pulsed light source in order to minimize light scattering effects.

In the event that a machining laser is to be used as the measuring laser, in the most simple case the filter wheel 10 is outfitted with a strongly attenuating filter and an open passage or a filter for the spectrum of the light source ("clear"). Of course, additional filters can be used as needed.

In the measurement mode, the laser light after the expansion is attenuated by the strongly attenuating filter to a desired power. In this situation, the open position or a clear filter is then in front of the photodetector 16. The photodetector 16 thus obtains the largest possible amount of reflected light and the collision object 2 is protected against damage from the laser.

In the machining mode, the filter wheel 10 is rotated by 180°. Now the laser impinges without attenuation on the workpiece 6. The reflected light produced during the machining is prevented by the filter from striking the photodetector 16 at full intensity, so that it is protected.

If the attenuation is done not with the filter, but with the mirror 13, then this must be removed from the beam path in the machining mode, in order to protect the detector 16, or it must be a correspondingly robust detector 16. It might also be necessary to protect the laser itself or the optics against the reflections.

If the measurement is being done with a light source 8 of such low power that no damage can be caused to the collision object 2, no attenuation at all will be needed. The entire measurement layout or at least the detector unit should be coupled out in the machining mode, for example by a diaphragm, if the detector is not robust enough to withstand all kinds of reflections without damage.

Of course, other optical systems are also conceivable. For example, suitably shaped mirrors may also be used to replace some of the lenses. Instead of a semi-transparent mirror, one could use a suitable prism which is suitably coated, for example. Filters also need not be used, or mounted on a wheel. For example, one or more sliders are also conceivable. Filters in turn might be replaced by semi-transparent mirrors or prisms. A laser with adjustable power may also be used. The beam path can be adapted so that the components are in a different arrangement with each other.

With a suitable layout (fast pulsed laser, sufficiently sensitive detector and precise timing), the internal reflections of the liquid jet can also be measured, as well as their position. In this way, the difference between the three states of the liquid jet 1 can be identified even without reflective surfaces 3 and one obtains the distance information.

Figure 6:
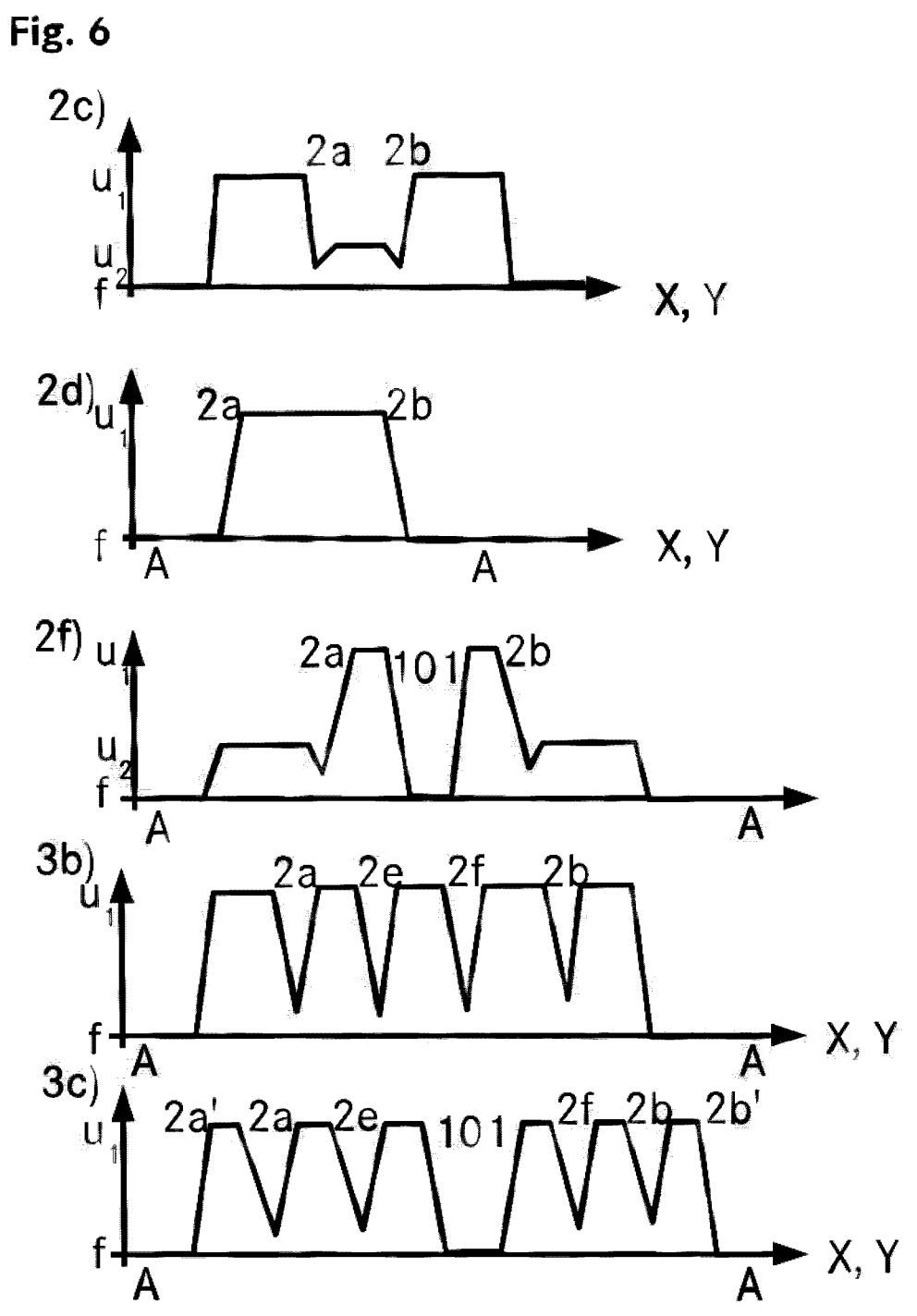

FIG. 6 shows possible measurement series for the case when a measurement is done with observation of reflections.

It is assumed here that the liquid jet is guided along line A-A in FIG. 2 across the collision object 2. The collision objects considered here are ones with reflective surfaces 3.

Five theoretical curves are shown. On the x-axis is plotted the configuration during a displacement (along A-A). On the y-axis is shown the signal of the photodetector. The numbers indicate the particular sample embodiment from FIG. 2 and FIG. 3. There are three signal levels:

f: practically no signal (free liquid jet 1);
u1: strong signal (unperturbed liquid jet 1 on reflective surface 3);
u2: weak signal (unperturbed liquid jet on less reflective surface).

If the liquid jet touches an edge, the signal drops to a low value. In this way, the configurations of the edges can be measured very exactly.

The measurement series are shown for quasi-continuous measurements. By this is meant measurements in which the signal is recorded and read out in very short intervals as compared to the speed of the relative movement. Of course, it is also possible to measure the edge positions in an iterative method. In this case, it is repeatedly determined on which side of an edge 2x the liquid jet 1 is found and the next measuring point is chosen within the interval between two measurements with different result. This measurement value then bounds the interval for the choice of the next point until the position is known with the desired accuracy.

The relative movement need not occur on straight lines. All possible scanning patterns are conceivable, as long as the decisive edges intersect. And each of these scanning patterns can be measured quasi-continuously or discretely. The measurement can also occur during a continuous movement or at standstill. An accelerated movement is also conceivable, but more difficult in its evaluation. However, if the movement is so fast that the liquid jet 1 can no longer be regarded as straight, the evaluation becomes more complicated and additional information needs to be obtained as to the direction of propagation FS of the jet 1. If the movement is even faster, it may happen that no intact liquid jet 1 can be formed of sufficient length. Under these circumstances, the measurement can no longer be performed.

The liquid jet may also be deflected by external electromagnetic fields, if it is electrically charged or has a current flowing through it. Gas pressure can also deform the jet. The same may occur when the direction of propagation FS of the jet is not parallel to the gravity vector. In all these instances, the curve describing the jet in its direction of propagation has to be determined.

In FIGS. 7a to 7e it is explained how the angle position of the liquid jet, or the jet angle 32 and the angle of incidence 31, can be determined. As already mentioned in the description of FIG. 3, only one example shall be considered here, namely that of a collision object 2 with three measurement edges 2a, 2e and 2f in two edge planes KE1 and KE2. The collision object 2 is assumed to be stationary, and the liquid jet 1 is moving in this example. The relative movement of the liquid jet 1 is measured. Also, only the movement in one dimension is considered. The other angles (32.2 and 31.2) may be measured and calculated in similar manner. Also the cases in which the collision object 2 is moving and the liquid jet 1 is stationary and the cases in which both are moving should be evaluated in similar fashion. Furthermore, it should be emphasized that the angles and planes described here are chosen somewhat arbitrarily. They should be used to convert closely situated systems of coordinates into each other or to describe the relative position of collision object 2 and liquid jet 1. For that, for example, a system of coordinates will be used that is defined by the collision object 2, defined by the jet 1, or defined by the plane of motion of the liquid jet-producing element BE_D.

FIG. 7a shows a sketch of the situation and indicates the known and the sought variables. The three points 2a, 2e and 2f mark the edges of the collision object 2. The two broken lines running through these points are the two parallel edge planes KE1 and KE2. The dotted line joins two of the edges 2a and 2e on the different edge planes KE1 and KE2. The normal N to the edge planes KE1 and KE2 is drawn as a vector in FIG. 7a. The bold broken line is the plane of motion of the jet-producing element BE_D. The three parallel dot-and-dash lines represent the liquid jet FS1-FS3 at the time of contacting one of the edges 2a, 2e, 2f, respectively.

Since the collision object 2 is well surveyed, the edge spacings in the edge plane KE1 or KE2 (22a and 22b) and the spacing 21 of the edge planes KE1 and KE2 are known. The measurement yields the lengths of the displacements of the jet along the plane of motion BE_D (23a and 23b). On the one hand, we seek the angle of incidence (angle between N and liquid jet FS) 31 and on the other hand the jet angle (angle of the liquid jet FS to the direction of movement BE_D) 32. With the aid of these two angles, we can then also describe the angle between the plane of motion BE_D and the edge plane KE: 90°+'31'−'32'.

Figure 7B:
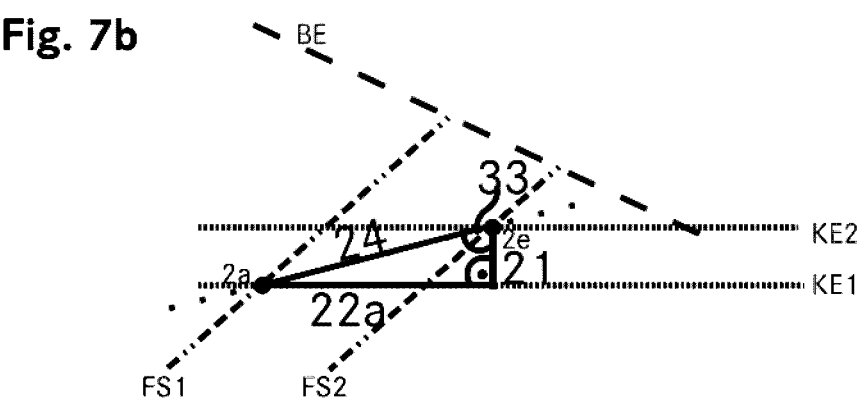

The following diagrams now illustrate how one can obtain these two angles from the given information:

In the triangle shown in FIG. 7b, the angle 33 and the length 24 can be determined by the tangent and the Pythagorean theorem from the two known spacings 21 and 22a.

Figure 7C:
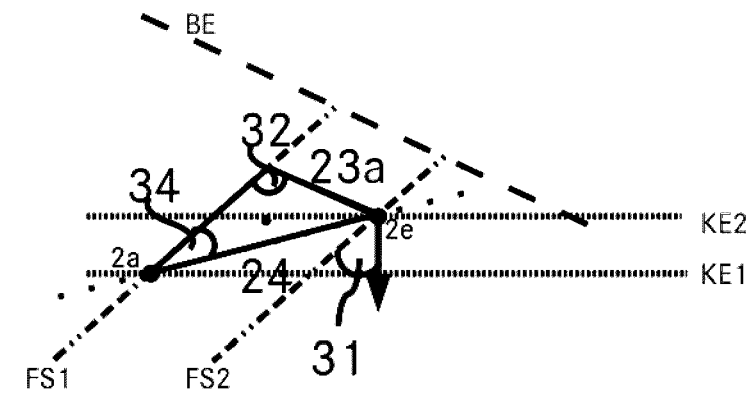

In FIG. 7c, a triangle has been generated by the parallel displacement of 23a. The length 24 is known from FIG. 7b. The angle 34 is equal to '34'='33'−'31'. For this, compare the angle at the edge 2e in FIGS. 7b and 7c. The angle 32 is one of the sought jet angles. It follows from the sine law that:

$$\frac{\sin('34')}{\sin('32')} = \frac{'23a'}{'24'}$$

With this, we have a first relation between the angle of incidence 31 and the jet angle 32.

Figures 7D, 8A, 8B:
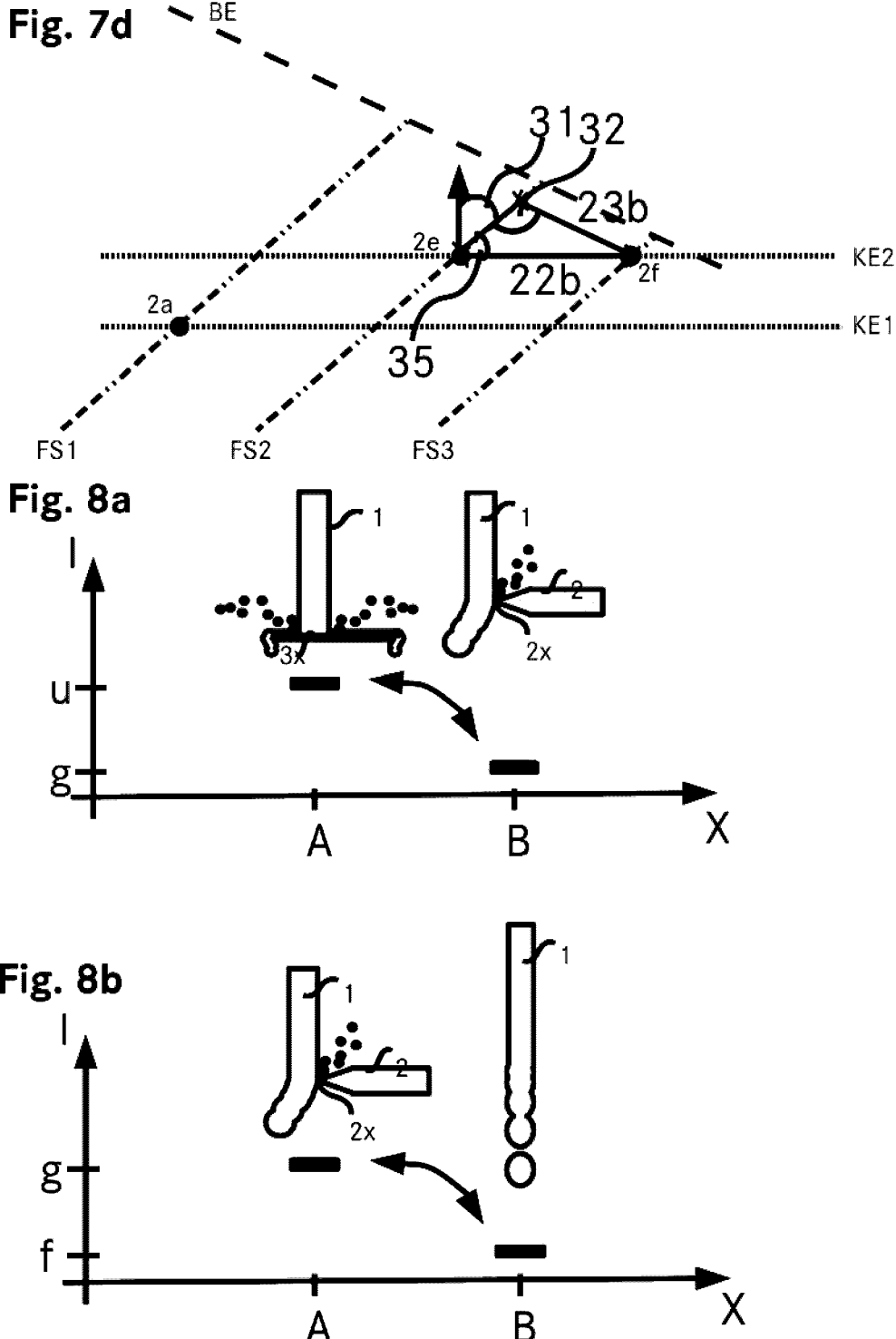
FIG. 8a-b Illustrations for the measurement principle.

In FIG. 7d another triangle is generated. This time by a parallel displacement of 23b. The two edges whose measurement values are now being compared lie in an edge plane KE2. If one compares this triangle with the one from FIG. 7c, it follows that '33'=90° and '24'='22b', i.e., equal to the spacing of the two edges in an edge plane. The measured spacing is now '23b'. It therefore follows that:

$$\frac{\cos('33')}{\sin('32')} = \frac{'23b'}{'22b'}$$

Thus, we now have two expressions for the two unknown angles and hence an unambiguous solution is possible for the two angles.

Of course, it is also possible for all three edges 2a, 2e and 2f to lie on different planes KE1-KE3: then the more general procedure of FIG. 7c will be applied twice. This can also be done by comparing the two edges 2e and 2f of the second edge plane KE2 in each case with the edge 2a of the first edge plane KE1.

In FIGS. 8a and 8b the measurements are further explained: 8a shows the transition from the jet state "unperturbed" (position A) to the jet state "perturbed" (position B). On the x-axis is plotted the configuration for displacement X. The y-axis gives the intensity I of any given sensor signal. The sensor measures two values: the value u indicates the unperturbed state and the value g the perturbed state. It depends on the sensor used and the quantity being measured whether u is greater than g or vice versa. Only one example is shown here.

The measurement now occurs as follows:

A state is determined. This might be either "unperturbed", "perturbed", or "free". One uses either a sensor which can distinguish all three states, or one that can only distinguish two states. If one uses a sensor that can only distinguish two states (such as "unperturbed" and not "unperturbed"), it is necessary to know the change in configuration so accurately that the measured changes can be matched up with measuring points.

Now the configuration change is undertaken. Either the collision object or the liquid jet or both can be displaced relative to each other. It is also conceivable that a configuration change will be accomplished by a tilting or rotating of collision object, liquid jet or both. Depending on the measurement strategy, larger or smaller displacements can be undertaken. The displacement itself can but need not be measured.

After the displacement has been accomplished, once again a state ("unperturbed" "perturbed", "free") of the liquid jet is determined. If a target state is determined, the configuration of the liquid jet producing element and the measurement edge is determined. This can be done either by an independent measurement (e.g., with laser distance meters), or by observing the displacement (e.g., by counting the revolutions of step motors). In a preferred embodiment, one uses the measurement system which is also used during the machining of workpieces with the machine being calibrated.

Different target states can be chosen, depending on the measurement method and the object. For example, a spatially small sampling rate can involve the state "perturbed". On the other hand, if the sampling is coarse, it may occur that there is no measurement detecting the "perturbed" state. In this case, it may be useful to define either "free" or "unperturbed" as the target state. Also in the case when a measurement method is being employed which only recognizes "unperturbed" states, the target state will be either "unperturbed" or not "unperturbed". The same holds for measurement systems which detect other states.

Instead of using the position of the first measurement of the target state, one can also use the last position with the liquid jet in a different state. Another possible choice is the point at the middle of the connecting line of the two positions. However, the latter two possibilities require that the configuration be determined for each state measurement, since only the following measurement will show whether the current position is the one prior to the state change.

The target state is the one which is assumed at the measuring point of the collision object. As a rule, the measuring point is part of a sharp edge and thus it involves the state "perturbed". But it is also conceivable for the measuring point to be a particularly well reflecting marking. In this case, the state would then be "unperturbed" and with maximum signal on a suitable sensor. Other kinds of markings are possible and can be recognized by other kinds of sensors. It may also be that the sensor itself represents the marking: a pressure sensor, for example, could recognize the pressure from the impinging liquid jet.

Depending on the sensor, one can now either detect the state directly, or the expected transition will be detected. A photosensor which can measure light coupled from a reflective surface back into the jet will be used for example with a collision object with edge and reflective surface and a configuration change so that the liquid jet runs across the transition "edge of the collision object" to "reflective surface". In this case, the sensor perceives the transition as a sudden signal rise or fall. This is shown in FIG. 8a).

An acoustic sensor 35 can distinguish, e.g., between the states "perturbed" and "free". In order to use such a sensor, one chooses a collision object with edge but without surface beneath this edge and a configuration change which takes the liquid jet across the transition "no limit downward until breaking up into drops" to "edge". Once again, the transition should be made evident by a sudden signal change, as is shown in FIG. 8b).

FIGS. 8a and 8b show digital curves in which the location is divided into discrete steps. Yet continuous measurements are also possible, as are those in which the step size is small enough to obtain smooth transitions between the states. In this case, a threshold must be set in order to define the transition as existing. Such a threshold can either be a fixed measurement value or a defined slope in the signal curve.

The invention claimed is:

1. A method for determining a position of a liquid jet, wherein the position is defined by at least one of the following features:
   (i) a position of a reference point of the liquid jet and
   (ii) a directional vector associated with the liquid jet, comprising the steps:
   a. providing a collision object having a measuring point for interacting with the liquid jet, b. detecting a state of the liquid jet in a first spatial configuration of the collision object relative to the liquid jet,
   c. performing at least one configuration change by changing from the first spatial configuration to a second spatial configuration of the collision object relative to the liquid jet, wherein said configuration change results in a change of the state of the liquid jet due to a change of an interaction of the measuring point and the liquid jet,
   d. detecting a spatial difference between the first and second configuration for determining the position of the liquid jet; and
   wherein
   e. in order to determine the state of the liquid jet, a measurement light of a desired frequency region of the electromagnetic spectrum is coupled into the liquid jet and at least one of the following effects is detected:
   (a) a back scattering of the measurement light or
   (b) a reflection of the measurement light in the liquid jet or
   (c) an extraction of the measurement light from the liquid jet is detected
   and wherein at least two states of the liquid jet are distinguished, including
      an unperturbed state in which the liquid jet has no interaction with the collision object;
      a perturbed state in which the liquid jet collides at least partially with the measuring point of the collision object, so that a deflection, division or interruption of the liquid jet results.

2. The method as claimed in claim 1, wherein the collision object has at least two measuring points for interacting with the liquid jet, wherein said measuring points are provided in different elevation planes, and in that at least two configuration changes are carried out.

3. The method according to claim 2, wherein said measuring points are arranged on planar surfaces, said planar surfaces being variously reflective.

4. The method as claimed in claim 1, wherein said configuration change is performed in a direction exclusively transverse to a lengthwise axis of the liquid jet.

5. The method as claimed in claim 2, wherein, in order to determine the position of a midpoint or a diameter of the liquid jet, the collision object is at first brought into interaction with the first measuring point on a first side of the liquid jet, and then it is brought into interaction with the second measuring point on a second side of the liquid jet.

6. The method of claim 1, wherein for determining the directional vector of the liquid jet, the first and second spatial configurations are associated with different axial levels of the collision object relative to the liquid jet.

7. The method as claimed in claim 1, wherein the measurement light is a light of a processing laser.

8. The method according to claim 7, wherein the light of the processing laser is used in an attenuated form as measurement light.

9. The method as claimed in claim 1, wherein the liquid jet in one of said spatial configurations impinges on a reference surface, which is offset with respect to the measuring point of the collision object along the lengthwise axis of the liquid jet.

10. The method as claimed in claim 9, wherein the reference surface reflects the measurement light upon impingement of the liquid jet in an unpertubed state so that the measurement light becomes or remains coupled into the liquid jet.

11. The method as claimed in claim 1, wherein the collision object comprises at least one sensor to detect electromagnetic fields of the measurement light.

12. The method as claimed in claim 11, wherein the sensor is configured for determining extracted or decoupled measuring light from the liquid jet.

13. The method as claimed in claim 1, wherein the state of the liquid jet is repeatedly detected at regular time intervals.

14. The method as claimed in claim 1, wherein the collision object is firmly connected to a workpiece clamping device of a processing machine providing a liquid jet-guided laser.

15. The method as claimed in claim 1, wherein the measuring point of the collision object comprises at least one sharp edge.

16. The method as claimed in claim 1, wherein the collision object comprises a recess providing a free passage for the liquid jet and in that the liquid jet in at least one of the spatial configurations the liquid jet is led through said recess in the collision object.

* * * * *